F. J. LAPOINTE.
CUTTER BAR AND BUSHING THEREFOR.
APPLICATION FILED MAY 13, 1919.
1,339,656.
Patented May 11, 1920.
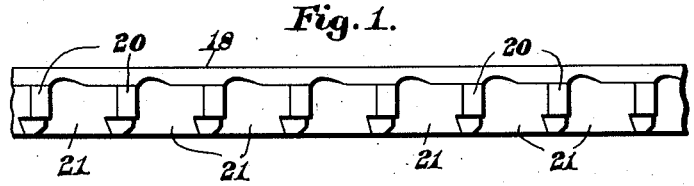
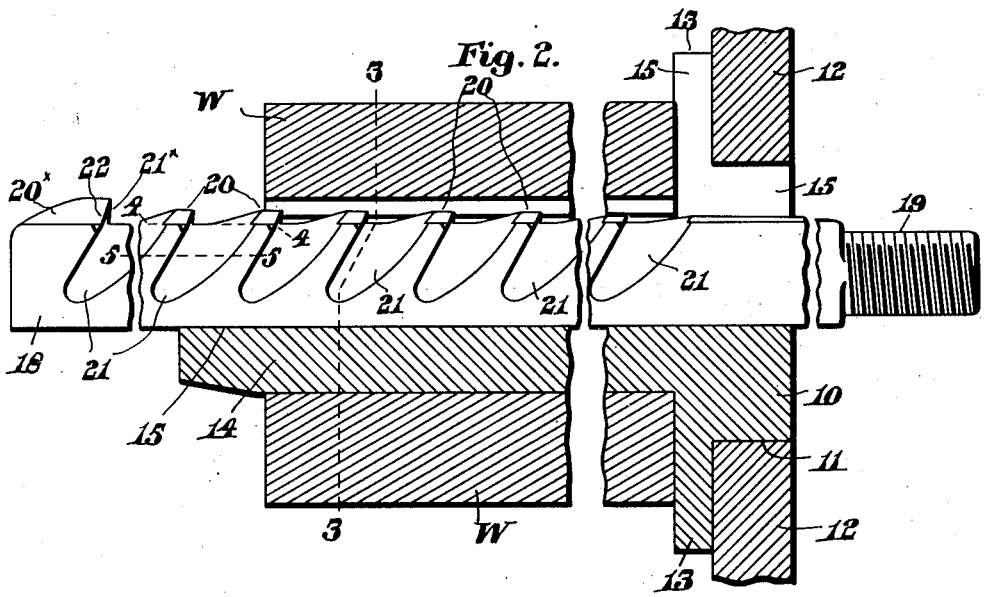
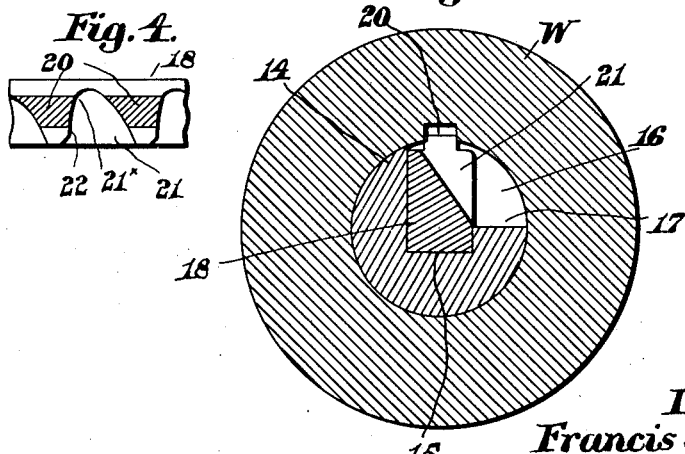
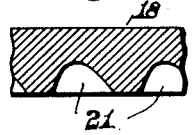
Inventor:
Francis J. Lapointe,
by Walter E. Lombard,
Atty.

UNITED STATES PATENT OFFICE.

FRANCIS J. LAPOINTE, OF ANN ARBOR, MICHIGAN.

CUTTER-BAR AND BUSHING THEREFOR.

1,339,656.

Specification of Letters Patent.

Patented May 11, 1920.

Application filed May 13, 1919. Serial No. 296,947.

*To all whom it may concern:*

Be it known that I, FRANCIS J. LAPOINTE, a citizen of the United States of America, and a resident of Ann Arbor, in the county of Washtenaw and State of Michigan, have invented certain new and useful Improvements in Cutter-Bars and Bushings Therefor, of which the following is a specification.

This invention relates to cutter-bars and work supporting bushings therefor adapted for use in connection with key-seat broaching machines in which the cutter-bar is connected to some reciprocatory member of the machine which moves it through a slot in the work supporting bushing thereby permitting the teeth thereon to cut a key-way in the pulley, gear, or other member supported on said bushing.

The present invention is an improvement upon another invention shown and described in Letters Patent No. 1,088,828, issued to me March 3, 1914.

The invention of the patent was intended for use in cutting long key-ways in cast iron but is not adapted for use in cutting steel.

The cutting bar herein shown and described is particularly adapted for use in cutting steel, the teeth being all sheared in one direction and separated sufficiently to permit the formation in said bar in front of each tooth of a tapered channel capable of taking care of the chips cut by the teeth and allowing said chips to be directed downwardly, rearwardly and outwardly into a clearance space formed in the supporting bushing.

The invention consists in certain novel features of construction and arrangement of parts which will be understood readily by reference to the description of the drawings and to the claims to be hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 1 represents a plan of a cutter-bar embodying the features of the present invention.

Fig. 2 represents an elevation of the same shown in connection with the bushing therefor and an article being operated upon said bushing and article being shown in section.

Fig. 3 represents a section of the same on line 3, 3 on Fig. 2, and

Figs. 4 and 5 represent respectively sectional details of the cutting bar on the lines 4, 4 and 5, 5 of Fig. 2.

Similar characters indicate like parts throughout the several figures of the drawings.

In the drawings, 10 is the hub of a work support adapted to be inserted in the opening 11 in the face plate 12 of a broaching machine of any well-known construction, the flange 13 being adapted to abut against the outer face of said plate 12 as shown in Fig. 2 of the drawings.

The work support is provided with a cylindrical shank 14 adapted to support the work W in which it is desired to cut a key-seat.

This work support 10, 13, 14 is provided with a radial slot 15 extending the entire length thereof and on one side of this slot the cylindrical shank 14 is cut away as at 16 to form a clearance space for the reception of the chips cut from the work during the cutting operation.

This clearance space extends to the flange 13 and its bottom wall 17 is preferably horizontal and in the same plane with the center of said work support.

In the slot 15 is positioned a cutter-bar 18, the shank 19 of which is cylindrical and threaded providing a means whereby said cutter-bar may be secured to a reciprocating member of the broaching machine.

The body portion of the cutter-bar has extending upwardly therefrom, a plurality of cutting teeth 20, the side walls of which lie within the side walls of the body portion of the cutter-bar 18.

Each tooth 20 has one side of its front face perpendicular to the under face of the cutter-bar 18 as shown at 21ˣ and said front face is sheared off transversely so that at its opposite side the face is undercut as indicated at 22 while the upper cutting edge of each tooth is perpendicular to a side face of the cutting-bar 18.

This formation of the teeth 20 forms an important feature of the present invention as results are obtained thereby which it has been found to be impossible to attain by the cutter-bars previously in use.

The successive teeth 20 are of varying depth as usual in cutter-bars used in broaching machines, the tooth nearest the shank 19 being of the least depth and each succeeding tooth being somewhat higher until the rear tooth 20ˣ at the opposite end of the cutter-bar attains the full depth desired.

The teeth 20 are spaced along the upper face of the cutter-bar at considerable distance apart and in front of each tooth 20 there is formed in the side wall of the cutter-bar a tapered channel 21, the upper part of which is the widest and deep enough to extend beyond the opposite side faces of the teeth 20.

The lower end of the wall of said channel 21 joins the side wall of the cutter-bar 18 at the level of the bottom wall 17 of the clearance space 16 in the shank 14.

Each channel 21 extends rearwardly with its lowest end approximately beneath the rear wall of its coacting cutting tooth.

When the common type of cutter-bar is in use, a short length of keyway may be cut readily but when an attempt is made to cut long keyways therewith, several operations are required in order to obtain the required depth because there is not in front of the teeth sufficient room for the chips to roll up in.

As a consequence of this lack of chip room, the cutter-bar will clog up before it has traveled a very few inches.

This is very objectionable and causes great loss of time and incurs considerable unnecessary expense for labor which could be obviated if a cutter-bar is used properly constructed.

When the common type of cutter-bar is in use, the chips roll up into a spiral form very compact and as a consequence they cause considerable trouble.

By the use of the cutter-bar herein shown and described, the chip does not roll itself into a compact spiral form of short length but on the contrary the chips when cut from the work coming into contact with the front sheared faces of the teeth 20 and the curved wall of the tapered channels 21 will be formed into a greatly elongated strip with a slight twist therein.

As the wall of the channel 21 is downwardly, outwardly and rearwardly inclined, this twisted chip will pass freely down said channel until deposited in the clearance space 16 and will not interfere in any manner with the proper operation of the cutter-bar.

This is due to the fact that the walls of the channels 21 are formed of such a shape with a continuous curve that there is no stopping point for the chips and each chip when cut by a tooth 20 runs down until it strikes a curved wall which causes a slight twist therein and it continues to move down the channel until it is unloaded from said channel falling directly to the floor when short keyways are being cut and unloading into the clearance space 16 when exceptionally long keyways are being cut.

With the teeth 20 sheared in the manner set forth and with the curved channels 21 formed in the cutter-bar in front of the teeth and inclined downwardly, outwardly and rearwardly, the cutter-bar is adapted to cut a keyway in steel at a single operation.

It is believed that the operation and many advantages of the invention will be readily understood without further description.

Having thus described my invention, I claim:

1. In a device of the class described, a cutter bar having a body portion rectangular in cross section from one face of which projects a narrower centrally disposed member provided with a plurality of cutting teeth extending transversely thereof, said body portion being provided with tapering channels between said teeth, all extending from one side of said member to the opposite side of the body portion and inclined downwardly and rearwardly from said teeth.

2. In a device of the class described, a cutter bar having a body portion rectangular in cross section from one face of which projects a narrower centrally disposed member provided with a plurality of cutting teeth extending transversely thereof, said body portion being provided with tapering channels between said teeth, all extending from one side of said member to the opposite side of the body portion and said teeth being undercut gradually from the continuous side of said bar to the channeled side thereof.

3. In a device of the class described, a cutter bar having a body portion rectangular in cross section from one face of which projects a narrower centrally disposed member provided with a plurality of cutting teeth extending transversely thereof, each tooth having its rear end chamfered off with the wall thereof forming a continuation of the front wall of a channel formed in the side of said body portion and extending rearwardly beyond the cutting edge of the following tooth, said channels extending from one face of the body portion to a point beyond the opposite faces of said teeth.

4. In a device of the class described, a guide consisting of a support having a cylindrical shank provided with a radial slot and a continuous clearance space on one side, the bottom of which is substantially opposite the center of said support, said clearance space extending through an opening in said support; and a cutter-bar fitted to and reciprocable in said slot having teeth in the upper edge thereof and a tapered channel in front of each tooth adapted to deliver the chips into said clearance space at the bottom wall of which each channel terminates.

Signed by me at Ann Arbor, Michigan, this 5th day of May, 1919.

FRANCIS J. LAPOINTE.

Witnesses:
THOMAS I. BIDDLE,
DAVID A. DE LONG.